United States Patent
Cobos Jimenez

(10) Patent No.: US 8,357,223 B2
(45) Date of Patent: Jan. 22, 2013

(54) WASTE TREATMENT FURNACE AND METHOD

(75) Inventor: Luis Cobos Jimenez, San Sebastian (ES)

(73) Assignee: Fundacion Tecnalia Research and Innovation, San Sebastian (ES)

( * ) Notice: Subject to any disclaimer, the term of this patent is extended or adjusted under 35 U.S.C. 154(b) by 0 days.

(21) Appl. No.: 13/452,730

(22) Filed: Apr. 20, 2012

(65) Prior Publication Data

US 2012/0198964 A1 Aug. 9, 2012

Related U.S. Application Data

(62) Division of application No. 12/162,034, filed as application No. PCT/ES2006/000032 on Jan. 26, 2006, now abandoned.

(51) Int. Cl.
*C21B 15/00* (2006.01)
*C22B 21/00* (2006.01)
*C22B 9/16* (2006.01)

(52) U.S. Cl. ....... 75/414; 75/10.21; 75/10.22; 75/10.65; 75/484; 75/523; 75/571; 75/582; 75/584; 75/686; 75/687; 588/261

(58) Field of Classification Search ............... 75/10.19, 75/10.21, 10.65, 392, 409, 412, 507, 571, 75/582, 594, 654, 671, 678, 686, 687
See application file for complete search history.

(56) References Cited

U.S. PATENT DOCUMENTS 4,147,531 A * 4/1979 Miller ............................ 75/687

* cited by examiner

*Primary Examiner* — Roy King
*Assistant Examiner* — Jared Wood
(74) *Attorney, Agent, or Firm* — Gary J. Gershik; Cooper & Dunham LLP

(57) ABSTRACT

This invention relates to a waste treatment furnace and method comprising: Generating a molten metal bed, which moves in a forward direction, such as to define a closed circuit in a cyclical and continuous manner, the surface of said bed comprising at least one essentially-slag-free segment. Loading waste onto the aforementioned essentially-slag-free segment, the waste being dragged by the molten metal bed such that it floats in the mentioned forward direction. Retaining the waste on the surface of the molten metal bed as it moves in the mentioned forward direction. Treating the waste under the effect of the constant and continuous heat exchange generated by the movement of the molten metal bed beneath the waste retained thereon.

16 Claims, 2 Drawing Sheets

WASTE TREATMENT FURNACE AND METHOD

RELATED APPLICATIONS

This application is a divisional of application Ser. No. 12/162,034, now abandoned filed Jul. 24, 2008, which is a U.S. National Phase of International Application No. PCT/ES2006/00032, filed Jan. 26, 2006, designating the U.S. and published in a language other than English on Aug. 2, 2007 as WO 2007/085665. The contents of these applications are incorporated herein by reference in their entireties.

OBJECT OF THE INVENTION

The present invention relates to a waste treatment furnace and method, especially for the valorization of waste such as steelmaking dust, aluminum slag and chips, electronic scrap, waste containing precious metals, or inerting dangerous materials such as asbestos fiber.

Waste is dumped into a molten metal bed, the complete treatment thereof being carried out practically on the surface of the molten metal bed. This treatment for example allows recovering the metal fraction contained in the waste.

BACKGROUND OF THE INVENTION

The processes used to treat waste from different industries are based on the example of large facilities including furnaces in which smelting, vitrifying or volatilizing the waste to be recovered, inerted or eliminated are carried out, which facilities are generally costly and fairly energy inefficient, whereby the waste recovery treatment becomes a very expensive process.

When molten metal is used, the treatment of the waste having a lower density than the density of molten metal is complicated due to the fact that such waste is not introduced therein as a consequence of there being a slag layer on the surface thereof, the lower density of which prevents contact of the waste with the molten metal.

Likewise the waste normally incorporates materials from different mixed classes, such as plastics, metals and others which, upon smelting, can cause contaminating gases or fumes that are difficult to treat. This implies having to carry out prior waste separation or selection treatments.

One type of waste to be treated would be steelmaking dust for example, containing large quantities of Zn, Pb or Cd and which are generated in refining and smelting operations in the steel production processes, collected in fume purification systems, and which form dangerous waste mainly due to the presence of Pb or Cd.

Currently, steelmaking dust is treated in different ways:
 Dumped into dumping sites for hazardous products. This is the least used option since it is costly and there are other better alternatives.
 Inerting by means of mixing agglomerating additives capable of generating an encapsulation that allows passing the leaching test established by law.
 Recovering the valorizable metals by heat treatment and separating and purifying the gases containing volatilizable metals.

There is a considerable number of methods designed specifically for treating steelmaking dust that intend to reach the objective of recovering the metals contained in said waste by means of applying very diverse techniques. Thus, for example, U.S. Pat. Nos. 6,322,745, 5,942,023 and 6,494,933 describe treatment methods in which both the technique used and the result obtained differ substantially according to the applied process. The mentioned patents comprise the state of the art currently in force, since it includes treating steelmaking dust by the three most used methods worldwide.

In these processes, reducing iron oxide contained in steelmaking dust is achieved in all the cases by means of feeding in a carbonaceous material as a reducer element. The differences lie in the way and moment in which the materials are introduced into the furnace, the geometry of the furnace and the heating system used.

Said differences can be seen particularly in the operating limitations that the different processes have. Heating systems can be mentioned as an example. The patents mentioned use, respectively in the indicated order, carbon combustion by oxygen injection, DC plasma arc and carbon combustion by blowing air.

With oxygen injection and plasma, high process temperatures are obtained causing important deterioration problems in the furnace refractories or reactors. The urgent necessity for panels and refrigeration systems directly impacts reducing energy efficiency.

The temperatures are lower with air blowing, but a variable part of the iron contained in the steelmaking dust is not reduced, and the material obtained must be further reprocessed in an arc furnace because the smelting temperature of the metal which would allow directly extracting the iron is not reached.

Another type of hard-to-treat waste would be aluminum chips having a very small density compared to molten metal, making the chips difficult to smelt and likewise problematic in that they easily rust in contact with air. A device for treating them is described in U.S. Pat. No. 6,036,745. This case describes a large furnace which communicates with two interconnected tanks to which the molten metal is conveyed from the furnace with the aid of a pump or pump unit. In the first tank, on one hand the solid metal particles are introduced from the outside and on the other hand the molten metal is introduced from the furnace, the mixture thus formed is then conveyed to a second tank from which the impurities, scum and slag from the bath are conveyed towards the outside, returning the molten metal to the furnace.

This furnace has a small outlet on one side to cause, with the aid of a pump, metal to flow towards the first tank in which a diverter is located, creating a spiral circulation facilitating the immersion of the waste particles in the flow of metal, for then passing this flow of metal through a conduit located at the bottom of the mentioned first tank, to a second tank in which the scum, slag and impurities are released, as has been previously mentioned, and then the flow of metal is introduced into the furnace.

Therefore, aluminum slag or chip treatment is carried out by immersion in the melt contained in the first tank by means of generating a downward spiral flow dragging the chips from the surface of the molten metal to the interior thereof.

This is a large furnace, is heated by resistances needing great potential and it requires a large length, basically making it cost-effective in large waste treatment facilities.

The installation has a complicated geometry due to incorporating on one hand the furnace and on the other hand the interconnected tanks and the communication conduits, increasing complexity of maintaining the facility, turning it off, turning it on and draining it.

Likewise it must be pointed out that in the installation object of this patent, submerged pumps are used to move the molten metal with the complexity that the maintenance thereof implies.

This installation is suitable for treating aluminum chips, but is dangerous due to the quick immersion of aluminum in the molten metal melt, since it can cause explosions if the aluminum chips contain water or moisture, given that this water is converted into hydrogen, which can violently explode.

Other installations are described in U.S. Pat. Nos. 6,217,823, 4,598,899 and 5,143,357, all of which focus on aluminum chip treatment

DESCRIPTION OF THE INVENTION

The waste treatment method object of the invention comprises the following steps:
- Generating a molten metal bed, which moves in a forward direction, such as to define a closed circuit in a cyclical and continuous manner, the surface of said bed comprising at least one essentially-slag-free segment.
- Loading waste onto the aforementioned essentially-slag-free segment, said waste being dragged by the molten metal bed such that it floats in the mentioned forward direction.
- Retaining the waste on the surface of the molten metal bed as it moves in the mentioned forward direction.
- Treating the waste under the effect of the constant and continuous heat exchange generated by the movement of the molten metal bed beneath the waste retained thereon.

The method comprises extracting slag so that the surface of the molten metal bed has the mentioned essentially-slag-free segment, which will coincide with the waste loading area. For that reason slag is extracted after retaining and treating the waste, and before loading waste corresponding to the next cycle.

The waste is retained before extracting the slag so that the waste treatment is carried out in a wide area extending from the loading of the waste to the extraction of the slag.

The method likewise comprises heating the molten metal bed after extracting the slag so that the essentially-slag-free segment always has a substantially constant temperature.

Heating the molten metal bed, depending on its nature, can be carried out by means of a plasma torch or electric arc and can be carried out at one or more points of the molten metal bed.

The heating can comprise additional heating near the retaining of the waste in order to accelerate the treatment thereof, for example for materials such as steelmaking dust, asbestos fiber, etc.

According to the method of the invention, once the waste is loaded onto the essentially-slag-free segment, it is dragged by the molten metal bed as if it was a conveyor belt, until it is retained, leaving the waste loading area free, which will be occupied by a new essentially-slag-free segment and with constant temperature of the molten metal bed. The waste is retained, floating on the surface of the molten metal bed until it has been completely treated (smelted, vitrified, volatilized . . .) by the action of the continuous movement of the molten metal bed.

The method of the invention is conceived so that immersing the waste in the molten metal bed is not necessary, but rather the waste is substantially smelted on the surface thereof under the effect of the temperature and the flow of the molten metal bed, favored by retaining the waste, reducing the treatment time thereof to allow its complete treatment due to the fact that the continuous movement of the metal bed beneath the waste accelerates heat exchange in treating the waste compared to a static metal bed.

The method provides discretional tapping of part of the molten metal bed for its recovery.

The molten metal bed has a high specific surface area in relation to its total mass in the treatment and heating area, i.e. a high ratio between the surface and the metal mass, which determines its capacity to treat a large amount of waste per unit of time and energy.

Loading of the waste is carried out according to its own treatment speed. Of course by adjusting the treatment parameters, loading of the waste can be carried out continuously.

It must likewise be pointed out that it is not necessary to carry out prior waste separation treatments. In the case of aluminum, the risk of explosions is reduced by preventing the immersion of aluminum chips or slag in the molten metal.

The molten metal bed can be formed by ferrous or non-ferrous metals depending on the nature of the waste to be treated.

The waste can comprise different fractions and especially any of the following:
- A metal fraction that is soluble in the molten metal bed at the temperature of the molten metal bed.
- A volatilizable fraction. This volatilizable fraction can comprise a metal part in the form of Pb, Zn or Cd oxides.
- A fraction that is non-soluble at the temperature of the molten metal bed and non-volatilizable. This fraction can comprise inorganic materials such as silica, lime, asbestos, for example.

The method of the invention allows carrying out the complete waste treatment, i.e. of all its constituent fractions.

The metal fraction that is soluble in the metal bed at the temperature of the molten metal bed is incorporated to the molten metal bed. Incorporating this metal fraction implies the valorization of this fraction of the waste.

The volatilizable fraction is subjected to an extraction and treatment phase, both while loading the waste and while retaining the waste and treating same, which comprises filtering the fumes generated from the contact of the waste with the molten metal bed, destroying possible elements or harmful compounds, and even recovering the metal part which could contain the volatilizable fraction, such as metal oxides for example.

The fraction that is non-soluble at the temperature of the molten metal bed and non-volatilizable is positioned on the surface of the molten metal bed in the form of slag.

It is thus possible to treat for example steelmaking dust, aluminum slag or chips, precious metals, rolling scale and sludge, electronic scrap and even waste such as asbestos or radioactive materials or other waste with a metal fraction (oxidizable or not) and other inorganic components susceptible to generating slag.

The invention also relates to a waste treatment furnace comprising a tank of molten metal that is carried out in a channel arranged such that it forms a closed circuit and molten metal driving means causing such molten metal to move inside the tank in a continuous and cyclical manner.

The furnace has at least one waste loading area for dumping the waste on the molten metal surface circulating through the tank of metal and at least one treatment area comprising waste retaining means for retaining the waste which is dragged by the molten metal in its movement, the retaining means being located substantially at the molten metal surface level.

The tank can additionally comprise discretional tapping means to tap part of the molten metal.

It is the object of the invention that the movement of the molten metal inside the tank causes the waste to move such that it floats from mentioned at least one loading area towards mentioned at least one treatment area in which the waste is retained by retaining means, whereas the molten metal continues its movement beneath the waste, causing the treatment thereof.

The furnace also comprises at least one slag extraction area, arranged behind the mentioned at least one treatment area, which allows obtaining a substantially slag-free molten metal surface in the at least one waste loading area in order to favor quick smelting of the waste.

The furnace further comprises at least one heating area that is arranged after the at least one slag extraction area so that the molten metal has in the mentioned at least one loading area a substantially constant temperature.

The at least one waste treatment area extends from the at least one loading area towards the at least one slag extraction area, the waste treatment being carried out substantially on the molten metal surface, without needing to immerse it in the molten metal. Once the waste is loaded in the at least one loading area, it is dragged by the molten metal as if it was a conveyor belt until it is retained by the retaining means or by the waste previously retained and being processed, generating an area that can extend from the loading area until the waste retaining area, whereby the waste occupies the surface of the molten metal bed, until it has been completely treated by the action of the continuous movement of the molten metal.

In the treatment and heating areas, the tank of molten metal has a reduced height in comparison to its horizontal section in order to obtain optimum energy efficiency, i.e. it has a high ratio between the molten metal surface and its mass.

It has been provided that the at least one heating area comprises at least one electric arc produced by means of a plasma torch for example.

The furnace also comprises treatment means for treating fumes that can be generated as a result of the combustion of the organic fraction in certain types of waste. These fume treatment means extend to the at least one waste treatment area and to the at least one waste loading when the nature of such waste requires it.

The molten metal bed can be ferrous or non-ferrous, according to the waste to be treated.

The at least one loading area of the furnace can be divided into several areas in which the different types of waste are selectively distributed for the purpose of optimizing the treatment conditions thereof.

Specifically the following loading areas are considered:

A waste loading area before the heating means. In this area the waste that needs a high smelting temperature and that generates little gases is loaded, as well as that waste incorporating material that is to be smelted before it reaches the heating means.

A waste loading area through heating means. Specifically when the heating means are formed by a plasma torch, the loading takes place through the central conduit of the plasma torch. The waste that is introduced through this conduit is of the type that does not generate gases, has a fine granulometry so that it can be introduced into the conduit or is the type of waste intended to be smelted in an inert atmosphere. This is the case for example with the aluminum chips that are introduced through this area in order to make them smelt quickly before coming into contact with the melt, thus avoiding oxidation thereof. Hazardous materials and precious metals can also be introduced through this area.

A loading area after the heating means. In this area materials generating a lot of fumes are loaded, which fumes can be treated with the fume treatment means located in the waste treatment area. They are materials such as steelmaking dust or electronic scrap for example.

It has been provided that waste can be introduced in the furnace in the form of pellets or briquettes formed by metal oxides.

The furnace of the invention can carry out complete waste treatment in wastes comprising different fractions and particularly any of the following:

A metal fraction that is soluble in the molten metal bed at the temperature of the molten metal bed.

A volatilizable fraction. This volatilizable fraction can comprise a metal part in the form of Pb, Zn or Cd oxides.

A fraction that is non-soluble at the temperature of the molten metal bed and non-volatilizable. This fraction can comprise inorganic materials such as silica, lime, asbestos for example.

The metal fraction that is soluble at the temperature of the molten metal bed is incorporated to the molten metal bed and can be collected through the tapping means.

The volatilizable fraction is collected by means of the fume treatment means and allows destroying possible elements or harmful compounds, and even recovering the metal part (Pb, Zn, Cd) which the volatilizable fraction could contain.

The fraction that is non-soluble and non-volatilizable at the temperature of the molten metal bed is transformed into slag on the surface of the molten metal bed.

DESCRIPTION OF THE DRAWINGS

To complement the description being made and with the purpose of aiding to better understand the features of the invention according to a preferred practical embodiment thereof, a set of drawings is attached as an integral part of said specification in which the following are shown with an illustrative and non-limiting character.

PREFERRED EMBODIMENT OF THE INVENTION

In reference to the figures, a preferred embodiment of the waste treatment furnace forming the object of this invention is described below.

Figure 1:
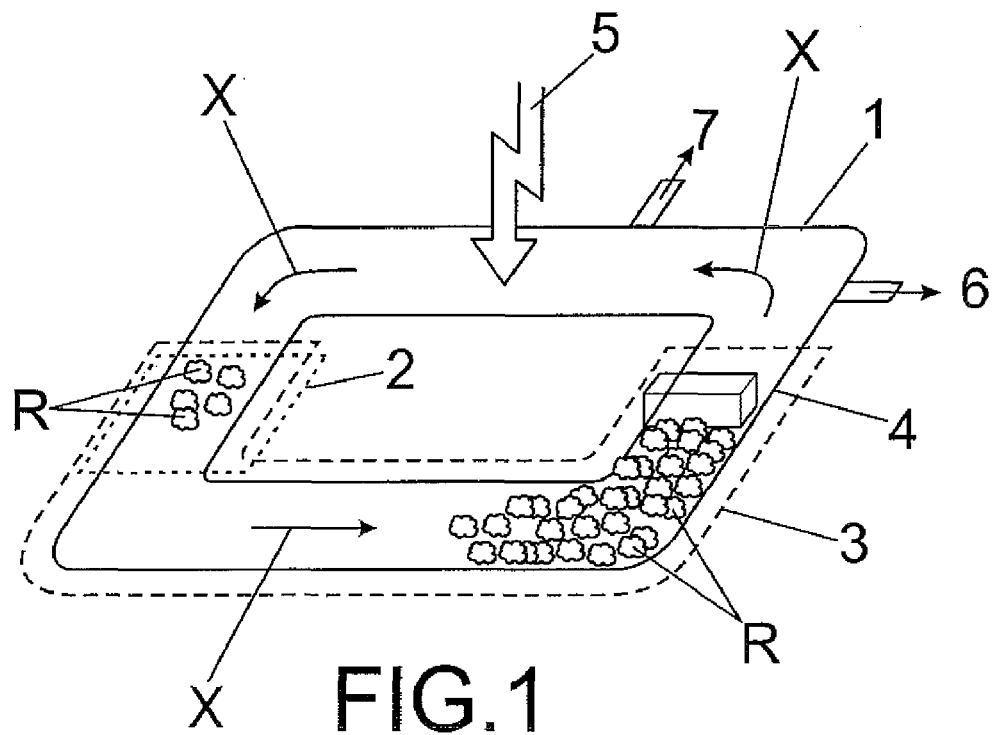
FIG. 1 shows a schematic view of the waste treatment furnace object of this invention.

As seen in FIG. 1, the waste treatment furnace comprises a tank (1) of molten metal, a loading area (2) for loading a waste (R) towards the tank (1), a treatment area (3) comprising waste retaining means (4) and driving means, not represented, to generate a movement of the molten metal in a continuous and cyclical manner inside the tank (1) in the direction indicated by the arrows (X), such that the molten metal drags the waste on its surface until reaching the retaining means (4) which do not allow the waste (R) to pass, whereas the molten metal continues its movement beneath the waste (R) causing the complete treatment of the waste, as will be described below.

Figure 2:
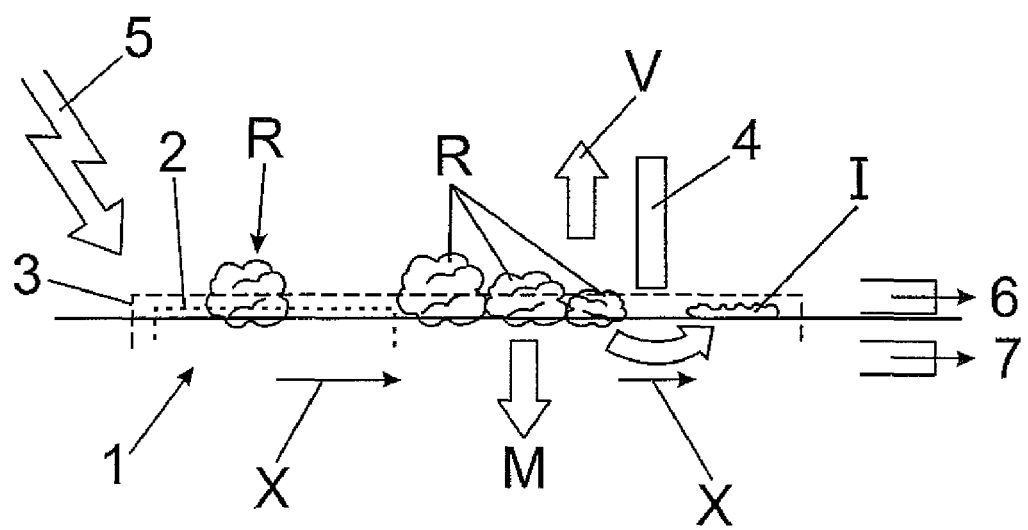
FIG. 2 shows a schematic representation of the waste treatment, including the retaining means for retaining such waste.

As shown in FIG. 2, the retaining means (4) are arranged close together on the molten metal surface and the waste acts against such means, retaining it but without preventing the movement of the molten metal.

The furnace also comprises a heating area comprising heating means (5), such as a plasma torch and a fume treatment area, not represented, extending to the treatment area (3) and/or to the loading area (2), according to the nature of the waste to be treated.

The furnace comprises a slag extraction area (6) arranged after the treatment area (3) and before the loading area (2) so that the molten metal surface is slag-free in the waste loading area (2).

The heating means (5) are arranged behind the slag extraction area (6), such that the molten metal has a substantially homogeneous temperature on its surface in the loading area (2).

The furnace can have discretional tapping means (7) to tap part of the molten metal.

In the treatment and heating areas the tank (1) of molten metal has little depth compared to its horizontal section so that the specific surface area of molten metal in movement is high in relation to the total molten metal mass.

As can be seen schematically in FIG. 2, the method allows complete waste treatment.

Specifically, FIG. 2 has represented waste (R) comprising the following fractions:
 A metal fraction (M) that is soluble in the molten metal bed at the temperature of the molten metal bed.
 A volatilizable fraction (V) which can comprise a metal part.
 A fraction that is non-soluble at the temperature of the molten metal bed and non-volatilizable (I).

As is shown in FIG. 2, the waste (R) is loaded into the loading area (2) and is transported by the molten metal until it is retained by the retaining means (4). Waste treatment begins in the loading area (2) but is completed while retained by the retaining means (4), which allows reducing the treatment time thereof. This treatment is favored by the continuous effect of the molten metal beneath the waste (R). Specifically, the soluble metal fraction (M) is incorporated in the molten metal bed (1), whereas the volatilizable fraction (V) will move on to a treatment and extraction phase that comprises filtering fumes and recovering the metal part that the fraction could contain and destroying possible hazardous materials that it could incorporate. The fraction that is non-soluble at the temperature of the metal bed and non-volatilizable (I) moves on to the surface of the molten metal bed in the form of slag.

Figure 3:
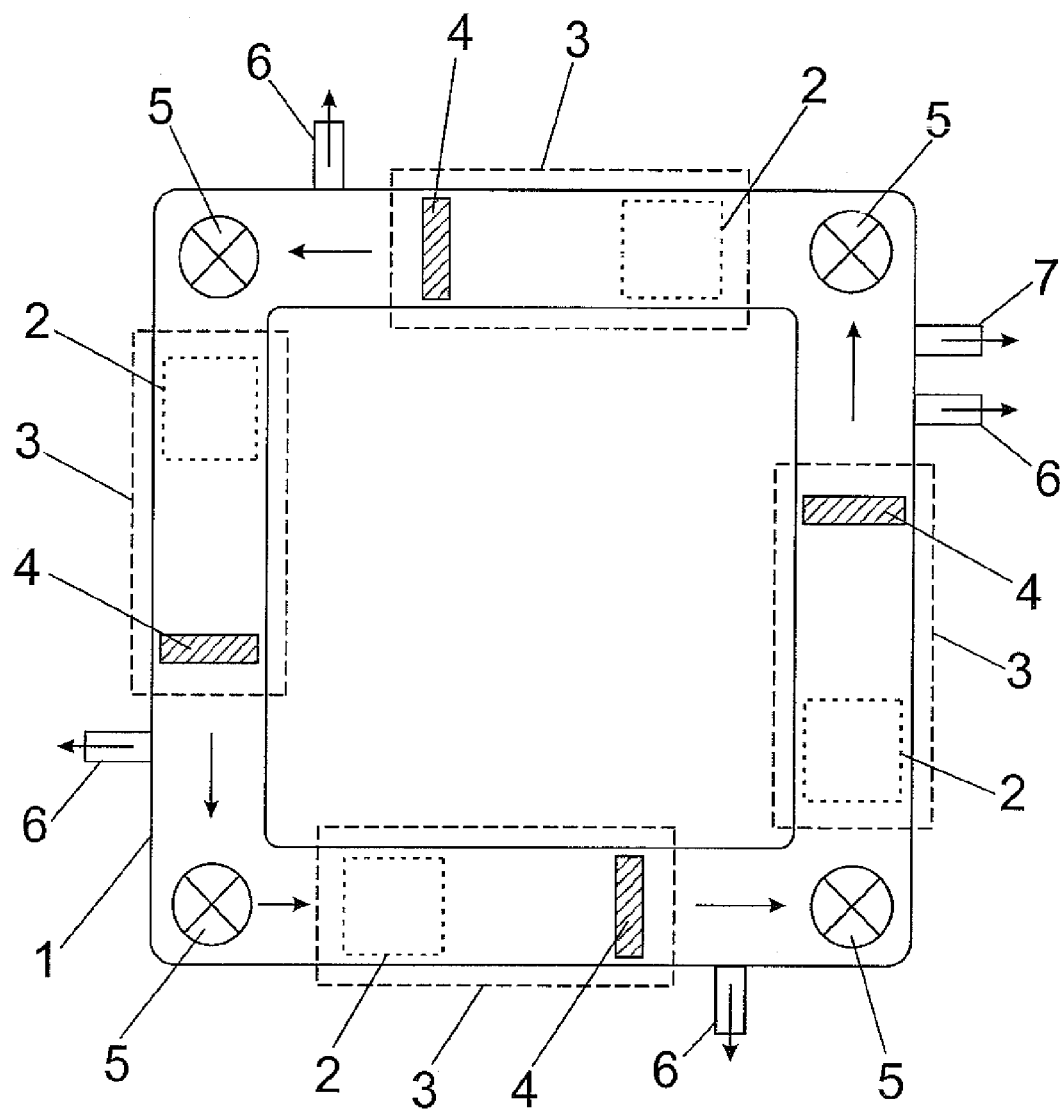
FIG. 3 shows a schematic representation of a furnace formed by four waste treatment areas.

The furnace shown in FIG. 1 relates to a basic embodiment comprising minimum means and areas for waste treatment, but it is evident that this embodiment has a modular character and can be repeated as many times as necessary depending on the quantities of waste to be treated. As an example, FIG. 3 schematically shows a furnace formed four areas similar to the furnace of FIG. 1.

The invention claimed:

1. A waste treatment method, comprising:
 generating a molten metal bed, which moves in a forward direction, such as to define a closed circuit in a cyclical and continuous manner, the surface of said bed comprising at least one essentially-slag-free segment;
 loading waste comprising a metal fraction that is soluble in the molten metal bed at the temperature of the molten metal bed, onto the aforementioned essentially-slag-free segment, the waste being dragged by the molten metal bed such that it floats in the mentioned forward direction;
 retaining the waste on the surface of the molten metal bed as it moves in the forward direction;
 treating the waste under the effect of constant and continuous heat exchange generated by movement of the molten metal bed beneath the waste retained thereon, the waste treatment being carried out substantially on the molten metal surface, without need to immerse the waste in the molten metal, such that the treatment of the waste begins after the loading of the waste and is completed while retained, the treatment comprising the incorporation of the metal fraction of the waste that is soluble at the temperature of the molten metal bed to the molten metal bed;
 further heating near the retaining of the waste in order to accelerate treatment thereof; and
 extracting the slag carried out in a zone of said circuit located after the zone of retaining and treating the waste and before the loading zone of the waste corresponding to the next cycle.

2. The waste treatment method of claim 1, wherein the waste comprises a volatilizable fraction.

3. The waste treatment method of claim 1, wherein the volatilizable fraction comprises a metal part.

4. The waste treatment method of claim 1, comprising a volatilizable fraction treatment and extraction phase.

5. The waste treatment method of claim 1, wherein the waste comprises a fraction that is non-soluble at the temperature of the molten metal bed and non-volatilizable.

6. The waste treatment method of claim 5, wherein the waste treatment causes incorporation of the fraction that is non-soluble at the temperature of the molten metal bed and non-volatilizable to the molten metal bed in the form of slag.

7. The waste treatment method of claim 1, further comprising loading of the waste in a continuous manner 8. The waste treatment method of claim 1, comprising heating the molten metal bed in order to obtain a homogeneous temperature in the essentially-slag-free segment.

9. The waste treatment method of claim 8, wherein the heating of the molten metal bed occurs by plasma techniques.

10. The waste treatment method of claim 8, wherein the heating of the molten metal bed occurs by an electric arc.

11. The waste treatment method of claim 1, comprising a discretional tapping phase for tapping part of the molten metal bed.

12. The waste treatment method of claim 1, wherein the molten metal bed has a higher specific surface area in the heating and treatment areas relative to the total molten metal bed mass when loading the waste and when retaining and treating the waste.

13. The waste treatment method of claim 1, wherein the molten metal bed is formed by ferrous metals.

14. The waste treatment method of claim 1, wherein the molten metal bed is formed by non-ferrous metals.

15. The waste treatment method of claim 1, wherein the waste is selected from the group consisting of: steelmaking dust, aluminum slag or chips, precious metals, waste with radiological activity, rolling sludge and scale, electronic scrap, ashes, and asbestos.

16. The waste treatment method of claim 1, wherein the waste is in the form of pellets or briquettes.

* * * * *